United States Patent [19]
Ohnishi et al.

[11] Patent Number: 5,326,953
[45] Date of Patent: Jul. 5, 1994

[54] WIRE ELECTRODE FEEDER FOR WIRECUT ELECTRICAL DISCHARGE MACHINE

[75] Inventors: Yoshitaka Ohnishi; Naoki Yagi, both of Hyogo; Yoshio Shibata, Aichi; Masato Banzai, Aichi; Toshio Suzuki, Aichi, all of Japan

[73] Assignee: Mitsubishi Denki Kabushiki Kaisha, Tokyo, Japan

[21] Appl. No.: 928,346

[22] Filed: Aug. 12, 1992

[30] Foreign Application Priority Data

Oct. 28, 1991 [JP] Japan .................. 3-281323

[51] Int. Cl.$^5$ .......................... B23H 7/10; H02N 2/00
[52] U.S. Cl. ................. 219/69.12; 219/69.2; 226/158; 310/323
[58] Field of Search ............... 219/69.12, 69.2, 137.7; 226/158; 310/323, 328

[56] References Cited

U.S. PATENT DOCUMENTS

4,990,738  2/1991  Taneda ............... 219/69.12
5,071,113  12/1991  Nakamura et al. ......... 226/158

FOREIGN PATENT DOCUMENTS

63-31333  6/1988  Japan .
2-121776  5/1990  Japan ............... 219/137.7
3-111130  5/1991  Japan ............... 219/69.2
4-96665   3/1992  Japan .
570101    8/1977  U.S.S.R. ............ 226/158
870030    10/1981 U.S.S.R. .

OTHER PUBLICATIONS

European Search Report, No Publication Date.
Database WPIL, Section Ch, Week 8231, Oct. 7, 1981, Derwent Publications Ltd., London, GB; Class M23, AN 82-65481E & SU-A-870 030 (Energomontazhproekt) Oct. 10, 1981, Abstract.
Patent Abstracts of Japan, vol. 016, No. 379 (E-1247) Aug. 13, 1992 & JPA-41-21-078 (Brother Ind., Ltd.), Apr. 22, 1992, Abstract.
Patent Abstracts of Japan, vol. 013, No. 164 (E-745), Apr. 19, 1989 & JPA-63-316-674 (Mitsubishi Electric Corp.), Dec. 23, 1988.
Patent Abstracts of Japan, vol. 016, No. 203 (M-1247), May 14, 1992 & JPA-40-30-918 (Brother Ind., Ltd.), Feb. 3, 1992, Abstract.

*Primary Examiner*—Geoffrey S. Evans
*Attorney, Agent, or Firm*—Sughrue, Mion, Zinn, Macpeak & Seas

[57] ABSTRACT

A wire electrical feeding device for an electrical discharge machine. Vibrator assemblies are utilized to feed the wire electrode through electrode guides of the electrical discharge machine. A first vibrator assembly vibrates through a locus which includes a component in the wire feeding direction. The wire electrode is selectively pressed against the first vibrator assembly when the first vibrator assembly is moving in a direction having a component in a wire feeding direction. In the alternative, a second vibrator assembly, which is coupled to the first, clamps the wire electrode when the first vibrator assembly is moving in a direction having a component in the wire feeding direction. The vibrator assembles may each be driven at different vibrational frequencies.

15 Claims, 13 Drawing Sheets

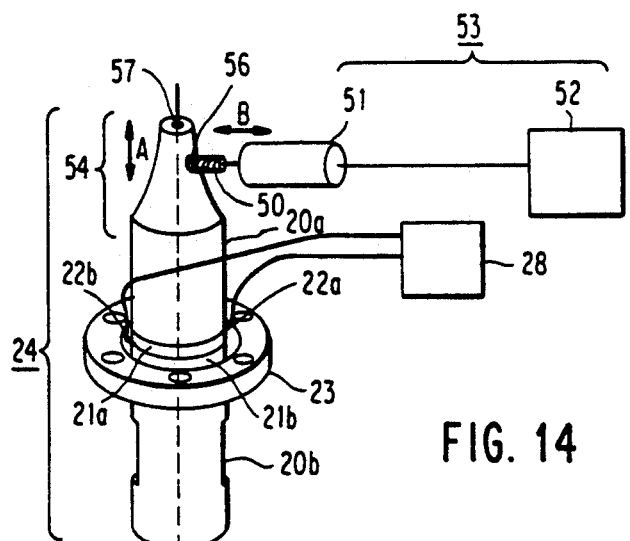
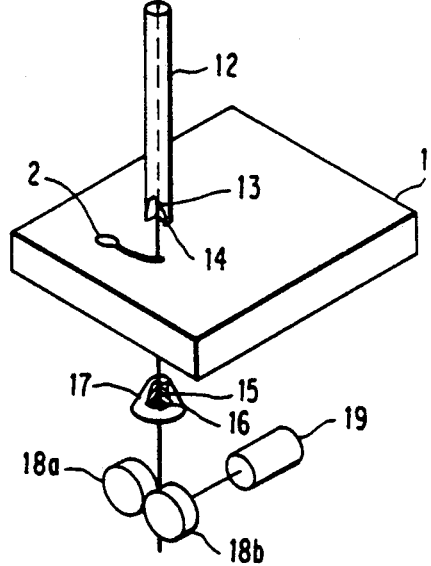
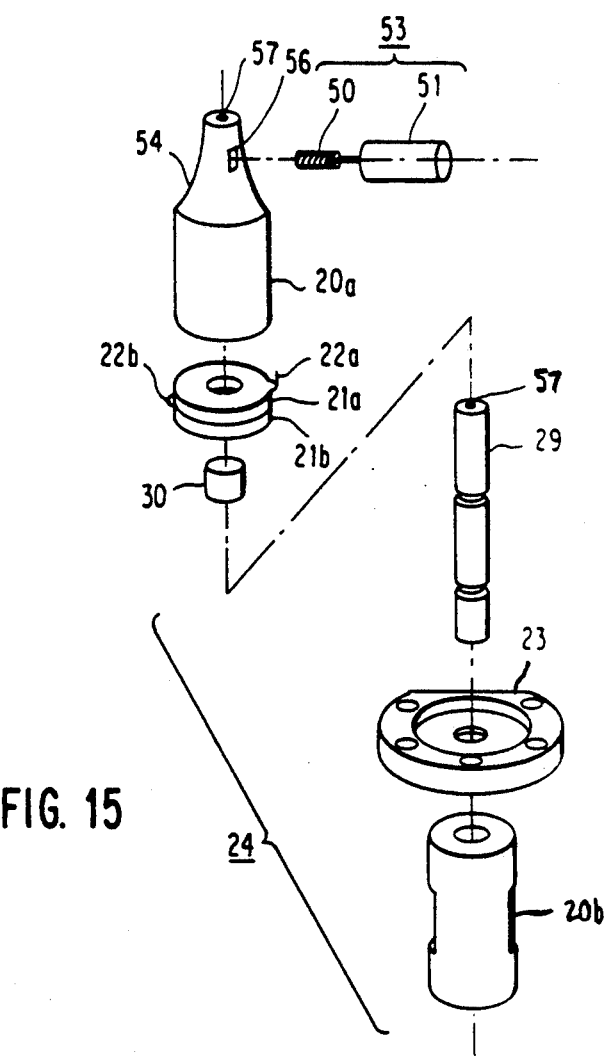
FIG. 14
FIG. 15

WIRE ELECTRODE FEEDER FOR WIRECUT ELECTRICAL DISCHARGE MACHINE

BACKGROUND OF THE INVENTION

1. Field of the Invention

The present invention relates to a wire electrode feeder for a wirecut electrical discharge machine.

2. Description of the Related Art

FIG. 23 illustrates the arrangement of a conventional wire electrode feeder disclosed in, for example, Japanese Patent Publication No. 31333 of 1988, wherein a workpiece 1 has a starting hole 2 pre-drilled at a machining start point. A wire electrode 11 is continuously provided to the work piece by a supply motor 3, via a supply pulley 4 coupled with the supply motor 3, and a clamp pulley 5 disposed opposite to the supply pulley 4. A first link 6 is extended to the clamp pulley 5, and a second link 7 is coupled to the end of the first link 6, the second link being pivotally moveable about support pin 8. A coil spring 9 is disposed between the second link 7 and an external fixture. A solenoid 10 is coupled with the end of the second link 7 which is opposite to the side thereof which is coupled to the coil spring 9. The wire electrode 11 is supplied through a wire electrode guide pipe 12, having a die-shaped upper wire electrode guide 13 made of diamonds. A sintered metal portion 14 is disposed on the lower end of guide pipe 12 for holding the upper wire electrode guide 13 to the lower end of the guide pipe 12. There also is a die-shaped lower wire electrode guide 15 that is made of diamonds and is held by a sintered metal portion 16 and set in a lower guide body 17. A pair of take-up rollers 18a and 18b are disposed opposite to each other with the wire electrode 11 therebetween, and a take-up motor 19 is coupled with the take-up roller 18b.

The operation of the wire electrode feeder shown in FIG. 23 will now be described. The workpiece 1 is placed on a work table (not shown) that is freely movable within a horizontal plane according to control commands. At the beginning of machining, the workpiece 1 is first set so that the starting hole 2, pre-drilled therein, is coaxial with the guide pipe 12. The clamp pulley 5 is then released by the restoring force of the coil spring 9. In this state, the wire electrode 11 is inserted from the top into the groove of the wire supply pulley 4. The solenoid 10 is then activated to press the clamp pulley 5 against the wire supply pulley 4 and the wire supply motor 3 is driven to feed the wire electrode 11 through the guide pipe 12 in the direction of the upper wire electrode guide 13. Since the upper wire electrode guide 13 and lower wire electrode guide 15 are supported to be coaxial with each other by a holding mechanism (not shown) at the beginning of machining, the wire electrode 11 passes through the upper wire electrode guide 13 and the lower wire electrode guide 15 and is inserted between the pair of take-up rollers 18a and 18b. In this state, the take-up rollers 18a, 18b and take-up motor 19 are ready to feed the wire electrode 11, and the clamp pulley 5 is released by energizing solenoid 10. The guide pipe 12 is then raised and removed from within the workpiece 1 by a moving mechanism (not shown), and the wire electrode 11 is thus inserted, under tension, in the workpiece 1.

To facilitate the above-described operation, the leading edge of the wire electrode 11 is reshaped by cut-off reshaping means (not shown) into a tapered shape so as to easily penetrate into the die-shaped upper and lower wire electrode guides 13, 15.

FIG. 24 illustrates an alternative conventional wire electrode feeder employing a supersonic vibrator used as a wire feed driving source to feed a wire electrode.

In this conventional device, first, a wire electrode 11 is inserted into the wire electrode guide 101 and a starting hole (not shown) provided beforehand in a workpiece 1. Subsequently, a presser plate 109 is released from a supersonic vibrator 106 by a releasing mechanism (not shown). The wire electrode 11 is led to a gap between the presser plate 109 and the supersonic vibrator 106, and the presser plate 109 releasing mechanism is reset to force the wire electrode 11 to be pressed against the supersonic vibrator 106 by the preload spring 108.

On completion of the wire electrode 11 stretching operation as described above, two free ends of the elastic body 104, are caused to each resonate in a flexure oscillating secondary mode and a vertical oscillation primary mode due to piezo-electric devices 105a, 105b. By causing the two modes to be 90° out of phase, both ends of the elastic body 104 are made to vibrate, on elliptical locuses in an identical direction of rotation, friction-driving the wire electrode 11 in a predetermined direction. The elastic body 104 included in the supersonic vibrator 106 is designed so that the two vibration modes have an identical resonant frequency and so that the vibration frequency is equal to the resonant frequency so as to cause a standing wave.

Also, in the conventional wire electrode feeder arranged as described above, the wire must be fed between the wire supply pulley 4 and clamp pulley 5 by the wire supply motor until it passes through the workpiece and reaches the take-up rollers, or supersonic vibrator. Accordingly, the wire electrode may tend to curl due to a slight speed and/or mounting position difference between the two pulleys. Also, the wire may buckle midway in the feeding path from the supply pulley to the electrode guide before the wire electrode passes the electrode guide.

Further, in the second conventional device wherein the wire electrode driving source comprises the supersonic vibrator, the wire electrode cannot be fed through the workpiece automatically, and after the wire electrode has been fed therethrough, friction, which tends to prevent the wire electrode from being driven is generated between the presser plate and wire electrode which are continuously pressed against the vibrator, and further since the vibrator and presser plate are of a flat shape, the wire electrode may be deformed or forced out of position.

SUMMARY OF THE INVENTION

It is accordingly an object of the present invention to overcome the disadvantages of the conventional devices by providing a highly reliable wire electrode feeder which allows a wire electrode to be fed without curling or buckling.

A wire electrode feeder according to one embodiment of the present invention has a plurality of vibrator assemblies having different vibrating directions, a coupling and supporting member for coupling and supporting the vibrator assemblies, wire electrode driving members provided in at least one of the vibrator assemblies, and a drive controller for driving the vibrator assemblies so that the wire electrode driving members vibrate while alternately holding and releasing the wire electrode in a circulating locus having a vibratory component in a wire electrode feeding direction.

A wire electrode feeder according to another embodiment of the present invention has a vibrator assembly, and a presser assembly for pressing the wire electrode against the vibrator assembly from a direction which is different from the vibrating direction of the vibrator assembly. The vibration of the vibrator assembly and the pressure of the presser assembly impart a vibratory component to the wire electrode in its feeding direction.

A wire electrode feeder according to another embodiment of the present invention comprises a plurality of vibrator assemblies which have different frequency differences between a resonant frequency and an anti-resonant frequency thereof and which have resonance characteristics such that the resonant frequency and anti-resonant frequency of the vibrator assembly which has a smaller frequency difference are located in an area between the resonant frequency and anti-resonant frequency of the vibrator assembly having a larger frequency difference. In this embodiment vibrator assemblies are driven in synchronization with each other.

A wire electrode feeder according to another embodiment of the invention comprises a first vibrator assembly including bar-shaped resonance blocks on both sides of an electromechanical transducer device acting as an excitation source and having a vibratory component in a wire feeding axis direction and a second vibrator assembly connected to one resonance block of the first vibrator assembly and having a vibratory component in a direction substantially perpendicular to the wire feeding axis direction. The resonance block of the first vibrator assembly which is not connected to the second vibrator assembly has a smaller sonic velocity, i.e. vibrational velocity than the other resonance block thereof which is connected to the second vibrator assembly.

A wire electrode feeder according to another embodiment of the invention comprises a first vibrator assembly for generating vibration in a wire electrode feeding axis direction and a second vibrator assembly provided on a part of the first vibrator assembly and having a pair of vibrators for generating vibration in a direction substantially perpendicular to the wire electrode feeding axis direction. Wire electrode driving members are disposed opposite to each other across the wire electrode proximate the loops of the vibration of the pair of vibrators in the second vibrator assembly. Also, a set gap between the wire electrode driving members is larger than a sum of the diameter of the wire electrode and the vibration amplitudes of the pair of vibrators. The second vibrator is rotatable relative to the wire electrode feeding axis so as to selectively engage the driving members with the wire electrode.

The vibrator assemblies in accordance with the present invention feed the wire electrode in a predetermined direction by transmitting a vibratory component in the wire electrode feeding direction to the wire electrode while gripping and releasing the wire electrode alternately.

BRIEF DESCRIPTION OF THE DRAWINGS

FIG. 14 is a perspective view of a wire electrode feeder for a wirecut electrical discharge machine in accordance with a fifth embodiment of the present invention.
FIG. 15 is an exploded view illustrating a vibrator assembly of the fifth embodiment of the present invention.

DESCRIPTION OF THE PREFERRED EMBODIMENT

Preferred embodiments of the present invention will now be described with reference to the appended drawings.

Figure 1:
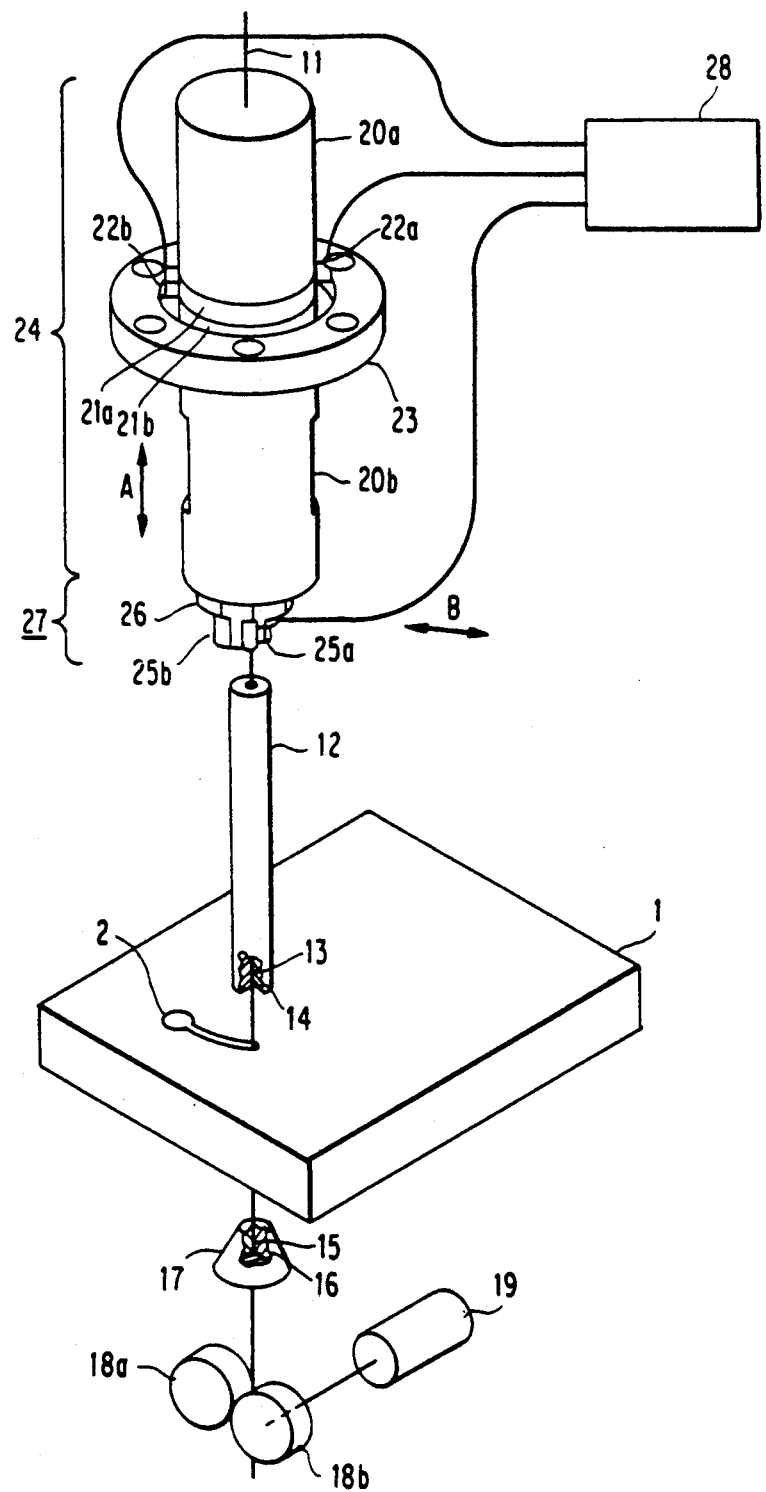
FIG. 1 is a perspective view of the first embodiment of the invention.

FIG. 1 illustrates the first embodiment of the present invention, wherein a first vibrator assembly 24 is constituted of resonance blocks 20a and 20b having piezoelectric devices 21a and 21b placed therebetween as vibration sources. Electrode plates 22a and 22b are respectively provided on piezo-electric devices 21a and 21b. Supporting member 23 mechanically supports first vibrator assembly 24. A second vibrator assembly 27 is constituted by a pair of vibrators 25a and 25b, and a mounting and fixing base 26 which fixes the vibrators 25a and 25b to the first vibrator assembly 24. A drive controller is provided for the two vibrator assemblies 24, 27.

Figure 2:
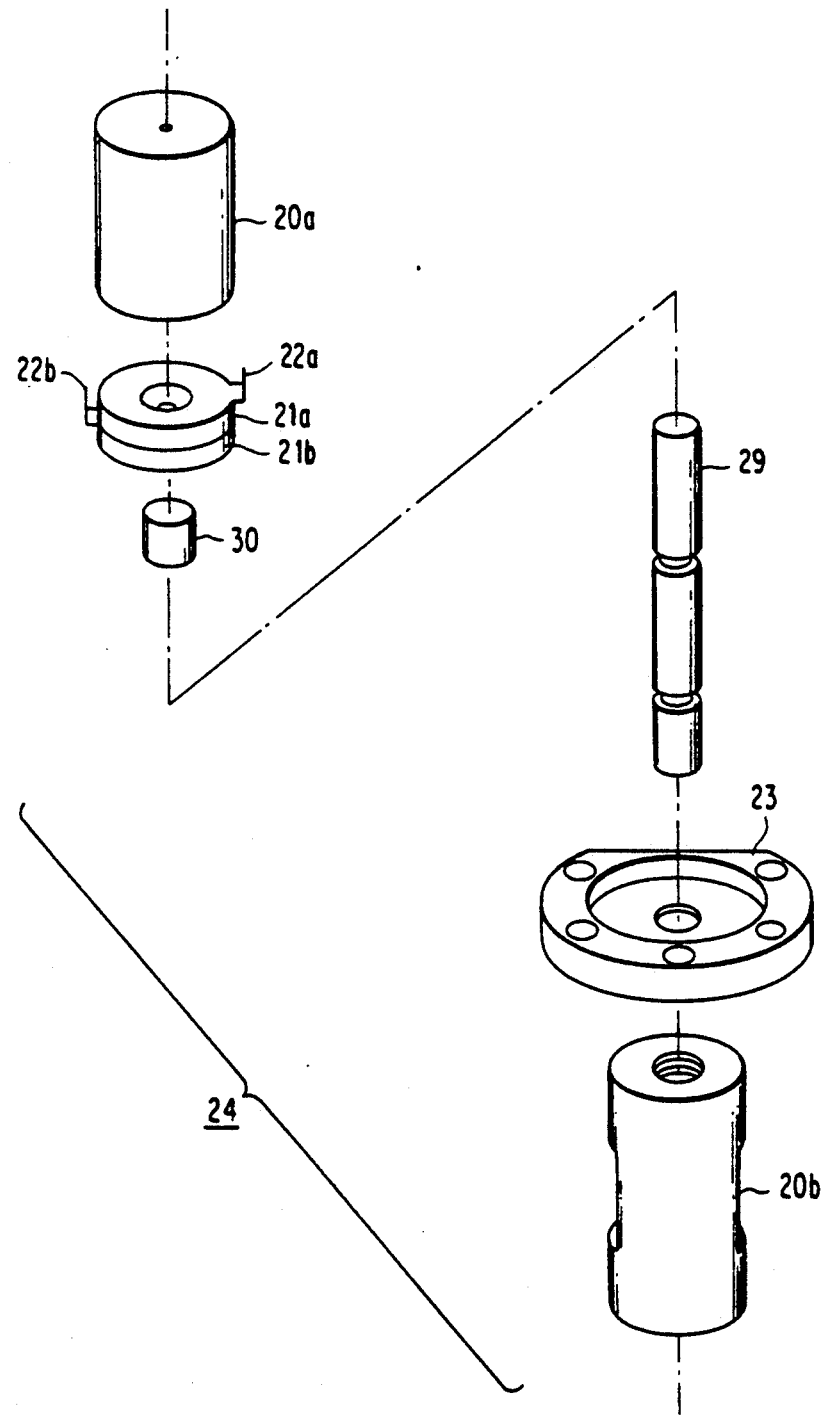
FIG. 2 is an exploded view of a portion of FIG. 1.
Figure 3:
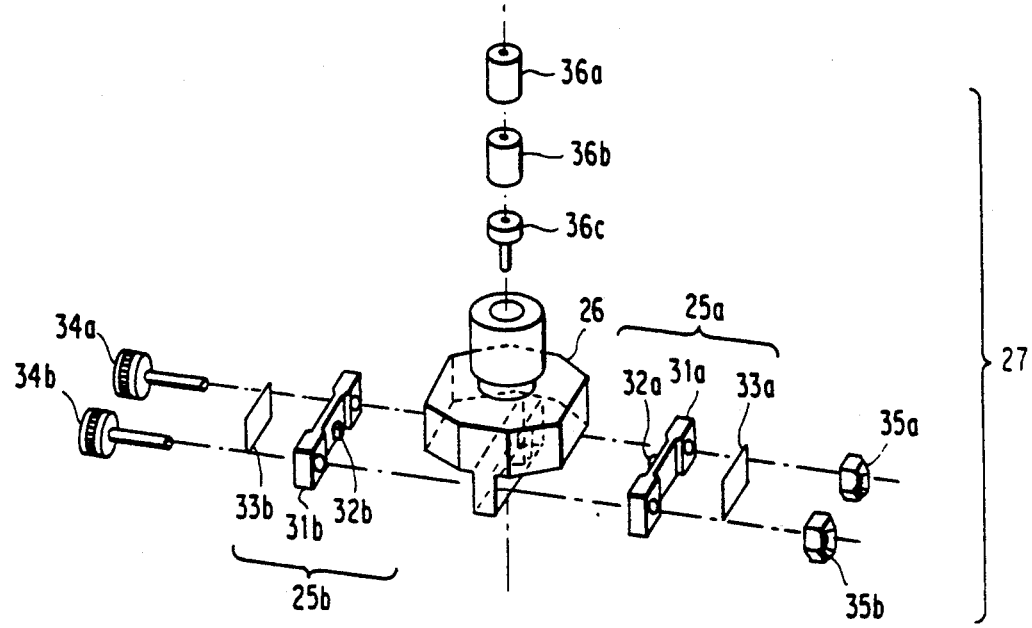
FIG. 3 is a exploded view of a portion of FIG. 1.

FIG. 2 and FIG. 3 are exploded views further illustrating the respective structures of the first vibrator assembly 24 and second vibrator assembly 27 shown in FIG. 1. In FIG. 2, bolt 29 connects the two resonance blocks 20a and 20b. Isolation pipe 30 is provided for electrically isolating the piezo-electric devices 21a, 21b and electrode plates 22a, 22b from the bolt 29. In FIG. 3, vibration plates 31a and 31b are associated with the vibrators 25a and 25b respectively. Protruding wire electrode driving members 32a and 32b are disposed in the centers of the vibration plates 25a, 25b respectively. Piezo-electric devices 33a and 33b act as the vibration source of the vibration plates 31a and 31b respectively. Bolts 34a and 34b cooperate with nuts 35a and 35b so as to fasten the vibrator pair 25a and 25b to the mounting and fixing base 26. Wire electrode guiding bushes 36a and 36b are embedded in the mounting and fixing base 26.

As opposed to the conventional wire electrode feeding apparatus having a wire supply motor 3, wire supply pulley 4 and clamp pulley 5, the feeding apparatus in the wire electrode feeder in accordance with the first embodiment has, as described above, the first vibrator assembly 24, the second vibrator assembly 27, and the drive controller 28 for the two vibrator assemblies 24 and 27.

The first vibrator assembly 24 is a known bolted Langevin vibrator consisting of the two resonance blocks 20a and 20b securely fastened by the bolt 29 with the piezo-electric devices 21a, 21b and electrode plates 22a, 22b inbetween. In the first vibrator assembly 24, a longitudinal vibration length designated by an arrow A in FIG. 1 is designed to provide a ½ wavelength of longitudinal vibration generated at a predetermined frequency. Accordingly, the application of an alternating-current voltage at the predetermined frequency to the piezo-electric devices 21a, 21b via the electrode plates 22a, 22b forces the first vibrator assembly 24 to generate longitudinal vibration wherein its points of maximum deflection are at both ends and its node is at a central part adjacent to the supporting and fixing member 23. Also, the diametrical centers of the resonance blocks 20a, 20b and bolt 29 are provided with a longitudinal through hole having a substantially large diameter as compared to the diameter of the wire electrode 11. These relative dimensions ensure that the wire electrode 11 can pass through the first vibrator assembly 24 without any influence from the vibratory operation of the first vibrator assembly 24.

Since the vibrator pair 25a and 25b, the primary parts of the second vibrator assembly 27, are identical to each other, the operation of only one vibrator 25a will be described. The vibrator 25a comprises the vibration plate 31a, the wire electrode driving member 32a provided in the center of the vibration plate 31a, and the piezo-electric device 33a acting as the vibration source of the vibrator 25a. Both ends of the vibration plate 31a are secured to the mounting and fixing base 26 by the installation bolts 34a, 34b and nuts 35a, 35b. The laminar piezo-electric device 33a is conductively mounted to the thin-sheet-shaped vibrating section of the vibration plate 31a by soldering or a conductive adhesive. The vibrating section of the vibration plate 31a is sized to produce primary flexing vibration, fixed at both ends thereof, at a frequency corresponding to the longitudinal vibratory frequency of the first vibrator assembly 24. Hence, the application of an alternating-current voltage at the predetermined frequency to the piezo-electric device 33a causes the center of the vibration plate 31a provided with the wire electrode driving member 32a to be the point of maximum deflection of the flexing vibration and vibrate in a direction indicated by an arrow B in FIG. 1.

Figure 4:
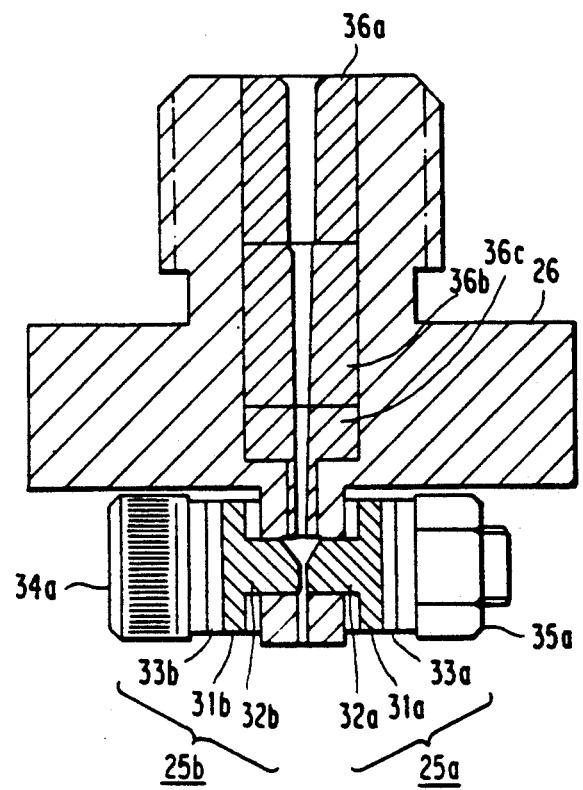
FIG. 4 is a sectional view of a portion of FIG. 1.
Figure 5:
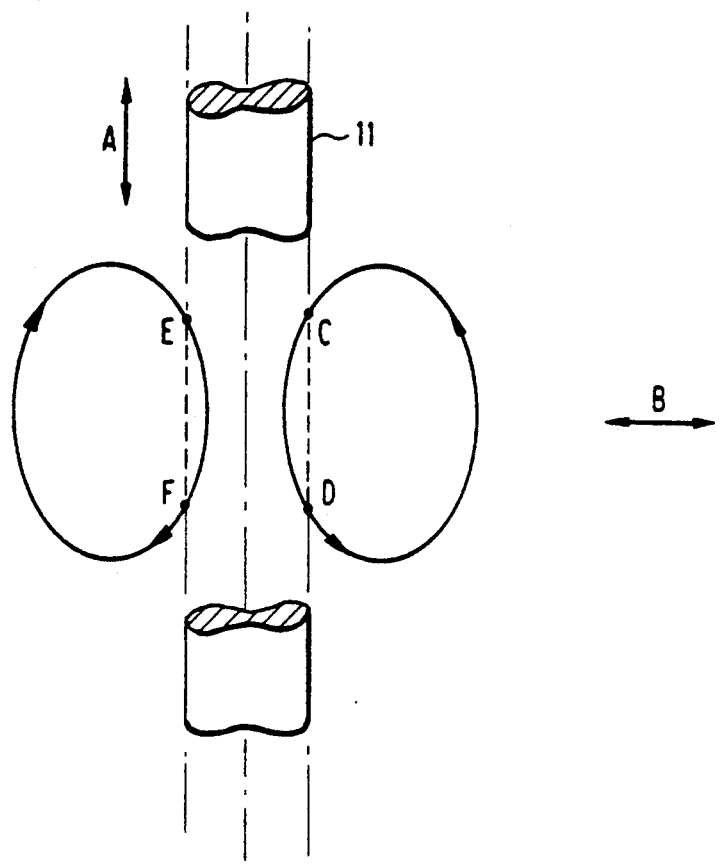
FIG. 5 illustrates the vibration loci at the driving members of the first embodiment.

As shown in a sectional view of FIG. 4, the vibrators 25a, 25b are disposed opposite to each other with a clearance provided between their respective wire electrode driving members 32a and 32b so as to allow the wire electrode 11 to pass therebetween. Therefore, the application of the same alternating-current voltage to the vibrators 25a and 25b causes the wire electrode driving members 32a, 32b to vibrate while alternately gripping and releasing the wire electrode 11 located therebetween. The mounting and fixing base 26 for the vibrator pair 25a, 25b is connected to one resonance block 20b of the first vibrator assembly 24. Therefore, by causing the first vibrator assembly 24 and second vibrator assembly 27 to resonate in a vibration mode at the same frequency, but approximately 90° out of phase, the wire electrode driving members 32a, 32b vibrate on an elliptical locus as shown in FIG. 5. Dotted lines CD and EF in FIG. 5 represent vibration loci of the wire electrode driving members 32a and 32b. In a vibration region from C to D (from E to F), the wire electrode 11 is gripped by the wire electrode driving members 32a, 32b and driven in a predetermined direction.

Figure 6:
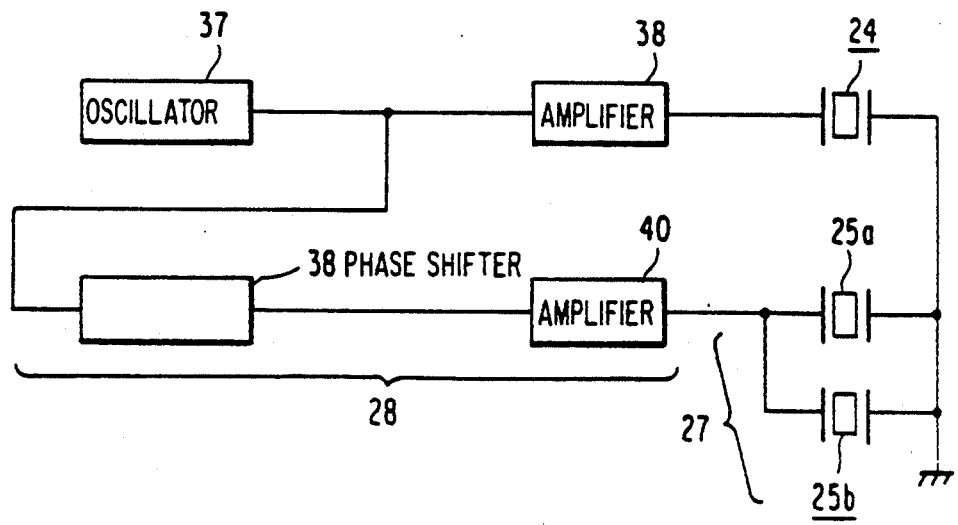
FIG. 6 is a block diagram of the drive controller of the first embodiment.

FIG. 6 is a block diagram illustrating the drive controller 28 for driving the first vibrator assembly 24 and second vibrator assembly 27. Oscillator circuit 37, and amplifier circuit 38 drive the first vibrator assembly 24 according to the sine-wave output signal of the oscillator circuit 37. A phase shifter circuit 39 which shifts the phase of the oscillator circuit 37 output signal by 90°, and an amplifier circuit 40 drive the second vibrator assembly 27 according to the sine-wave signal of the phase shifter circuit 39. The oscillation frequency of the oscillator circuit 37 is preset to be the resonant frequency of the first and second vibrator assemblies 24, 27, and the drive signal phase of the second vibrator assembly 27 is shifted by the phase shifter circuit 39 so that the vibration of the second vibrator assembly 27 is approximately 90° out of phase with respect to the first vibrator assembly 24. At this time, the moving directions of the wire electrode driving members 32a, 32b on the elliptical vibration loci are reversed depending on whether the phase is shifted in a leading or lagging direction. This allows the driven direction of the wire electrode 11 to be controlled as desired.

Figure 7:
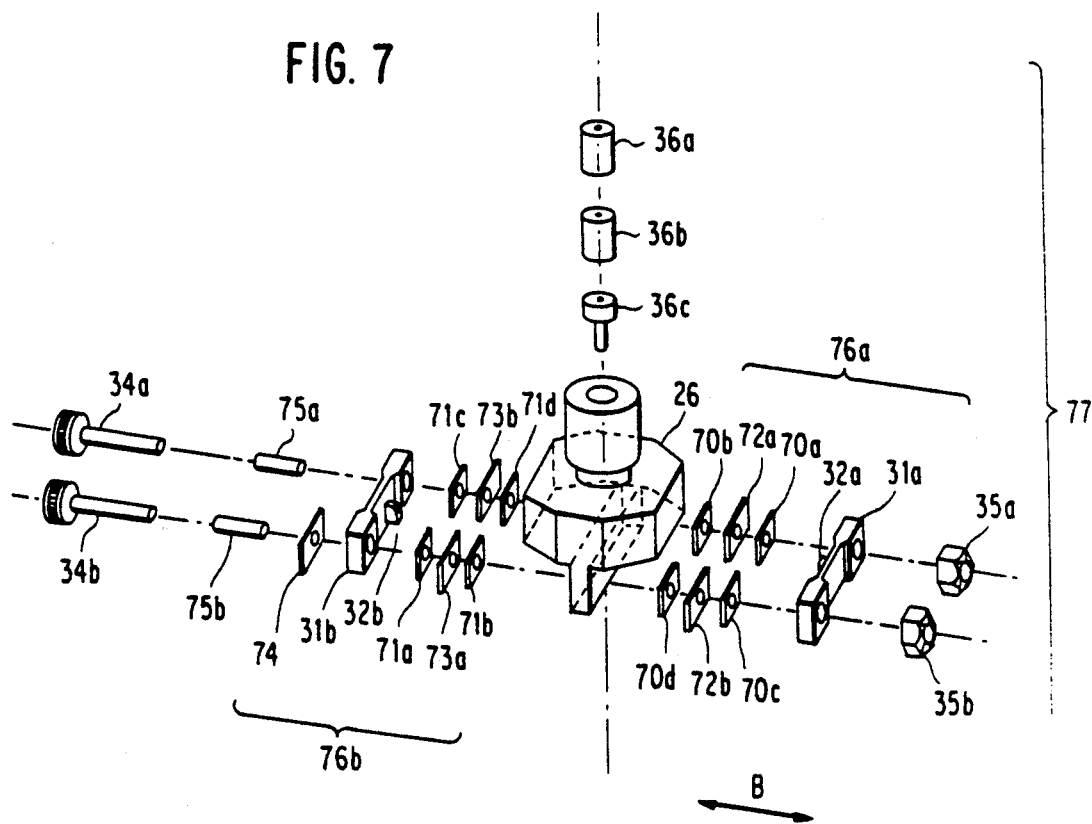
FIG. 7 is an exploded arrangement view showing a second vibrator assembly of a second embodiment of the present invention.

In the first embodiment, the sheet-shaped piezo-electric devices 33a, 33b acting as the excitation sources of the vibration plates 31a, 31b in the vibrator pair 25a, 25b constituting the second vibrator assembly 27 are provided proximate the thin sheet-shaped vibrating portions of the vibration plates 31a, 31b. Alternatively, the piezo-electric devices serving as the excitation sources may be disposed as described below. FIG. 7 is an exploded view illustrating the arrangement of a second embodiment wherein the piezo-electric devices are different from those in the first embodiment. Referring to FIG. 7, piezo-electric devices 70a to 70d and 71a to 71d are provided. Electrode plates 72a, 72b, 73a, 73b and 74 are also provided as illustrated. Insulation pipes 75a and 75b extend through the piezo-electric device and electrode plates so as to insulate the same from bolts 34a and 34b. A pair of vibrators 76a and 76b thus constitute a second vibrator assembly.

The excitation sources of the vibration plates 31a, 31b in the pair of vibrators 76a, 76b constituting the second vibrator assembly 77 in the second embodiment are built in an arrangement similar to the bolted Langevin vibrator employed in the first vibrator assembly 24 in the first embodiment. When an alternating-current voltage, having a frequency corresponding to the primary flexural natural oscillation frequency of the vibrating portions of the vibration plates 31a and 31b, is applied across the mounting and fixing base 26, the ground electrode side of the electrode plate 74 and the drive electrode sides of the electrode plates 72a, 72b, 73a, 73b, the centers of the vibration plates 31a, 31b become the point of maximum flexural vibration and vibrate in directions indicated by an arrow B in FIG. 7. The arrangement and operation of the first vibrator assembly 24 and the feeding operation of the wire electrode 11 in the present embodiment are identical to those in the first embodiment and thus will not be described in greater detail.

The vibration source of the first and second vibrator assemblies constituting the feeding means in the wire electrode feeder concerned with the present invention is not limited to the piezo-electric devices employed in the first and second embodiments but may be, for example, magnetostrictors, as described below, or any other vibration source.

Figure 8:
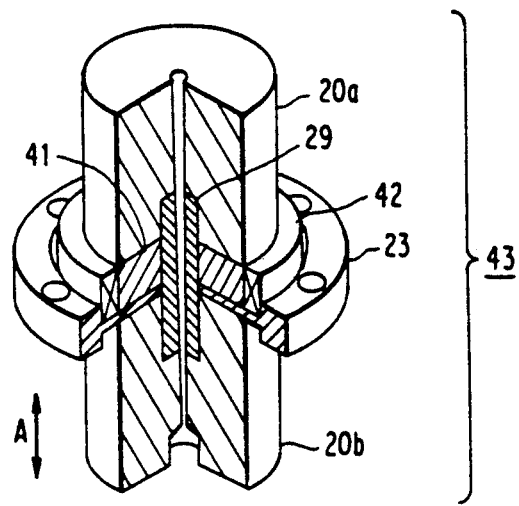
FIG. 8 is a perspective view of a first vibrator assembly, in partial section of a third embodiment of the present invention.
Figure 9:
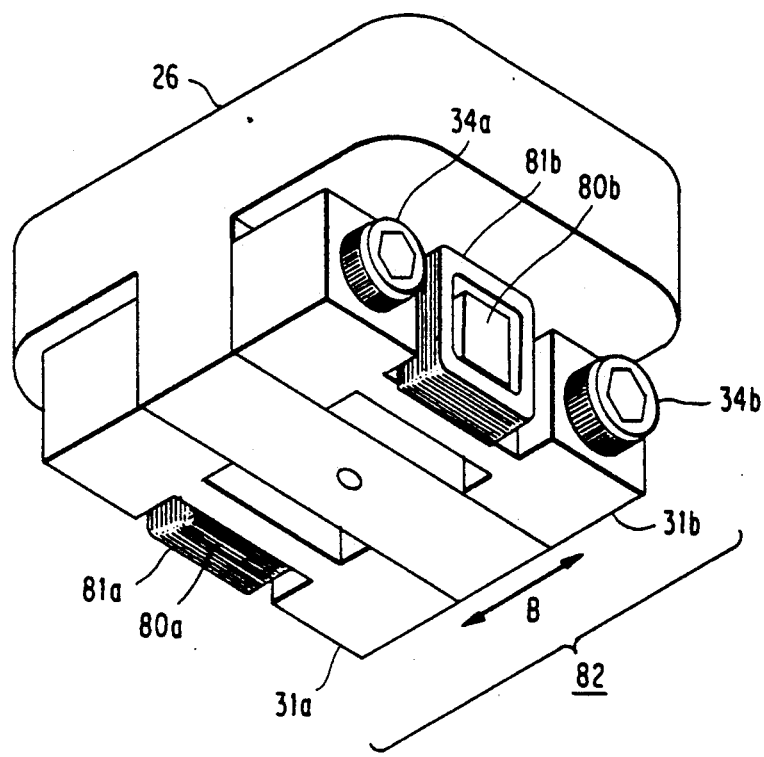
FIG. 9 is a perspective view of a second vibrator assembly of the third embodiment of the present invention.

FIG. 8 is a diagram (partly in cross section) illustrating a third embodiment of the invention employing a magnetostrictor in an area corresponding to the first vibrator assembly of embodiments 1 and 2. An exciting coil 42 is disposed around a magnetostrictor 41 so as to constitute a first vibrator assembly 43 employing the magnetostrictor 41 as a vibration source. Similarly, FIG. 9 shows an example wherein magnetostrictors are employed as the excitation sources in an area corresponding to the second vibrator assembly 27 in the first and second embodiments. Referring to FIG. 9, magnetostrictors 80a and 80b are installed proximate the vibration plates 31a, 31b. Exciting coils 81a and 81b are provided in the periphery of the magnetostrictors 80a, 80b so as to constitute vibrator assembly 82 arranged using the magnetostrictors 80a, 80b as excitation sources.

A direct current for generating the bias magnetic field of the magnetostrictor 41 is overlapped with an alternating current of a predetermined frequency acting as the vibration component of the vibrator assembly 43 and the resultant current is forced to flow in the exciting coil 42. Accordingly, longitudinal resonance indicated by an arrow A in FIG. 8 is produced in the first vibrator assembly 43 similarly to the first vibrator assembly of the first and second embodiments. Similarly, a direct current for generating the bias magnetic field of the magnetostrictors 80a, 80b is overlapped with an alternating current of a predetermined frequency serving as the excitation component of the vibration plates 31a, 31b, and the resultant current is forced to flow in the exciting coils 81a, 81b, whereby resonant vibration in directions indicated by an arrow B in FIG. 9 is generated in the second vibrator assembly 82.

Also, the vibrators for the wire electrode feeder of the present invention are not limited to the resonance vibrators employed in the embodiments as described above but may be vibrators which are non-resonance driven as described below.

Figure 10:
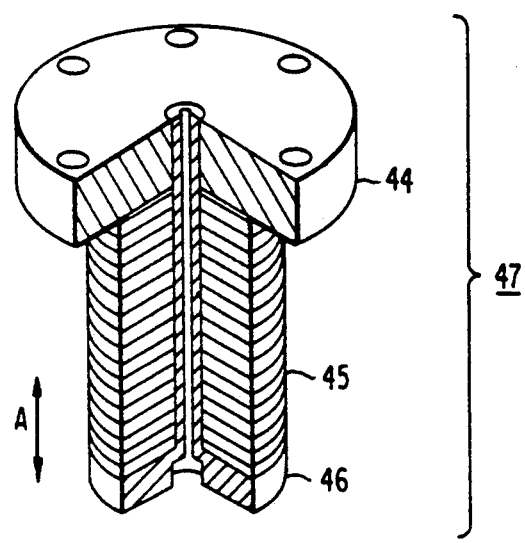
FIG. 10 is a perspective view of a first vibrator assembly, in partial section of a fourth embodiment of the present invention.
Figure 11:
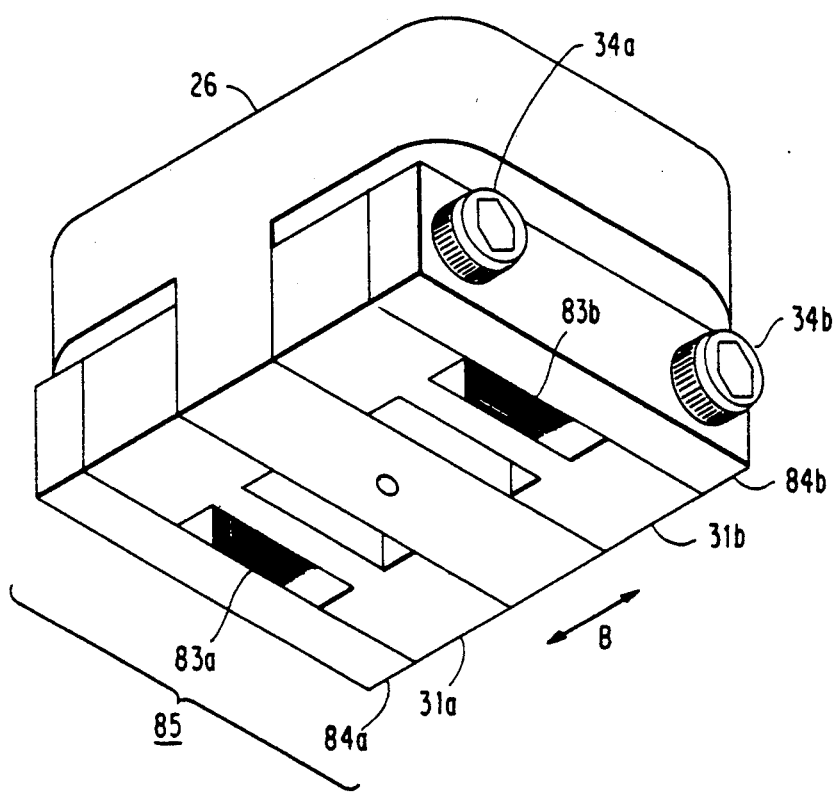
FIG. 11 is a perspective view of a second vibrator assembly of the fourth embodiment of the present invention.

FIG. 10 illustrates a fourth embodiment employing a non-resonance driven vibrator in an area corresponding to the first vibrator assembly in the embodiments above. A pipe-shaped laminated piezo-electric device 45 is fastened to a supporting member 44 by a fastening member 46. Accordingly, a first vibrator assembly 47 employs the laminated piezo-electric device 45 as a vibration source. Similarly, FIG. 11 shows an example wherein a laminated piezo-electric device-based non-resonance vibrator is employed as the excitation source in an area corresponding to the second vibrator assembly. In FIG. 11, the laminated piezo-electric devices 83a and 83b are coupled to vibration plates 31a and 31b for non-resonance driving thereof. Fixing plates 84a and 84b support the laminated piezo-electric devices 83a and 83b, so as to constitute a second vibrator assembly 85 employing the laminated piezo-electric devices 83a and 83b as drive sources.

The laminated piezo-electric device 45 generates distortion displacement in a direction designated by an arrow A in FIG. 10 substantially proportional to an applied voltage. Therefore, by overlapping a direct current for producing bias displacement with an alternating current acting as the vibration component of the vibrator assembly 47 and applying the resultant current to the laminated piezo-electric device 45, vibration synchronized with the frequency of the alternating-current voltage applied to the first vibrator assembly 47 can be generated. Similarly, a direct current for generating a bias displacement is overlapped with an alternating current acting as the driving component of the vibration plates 31a, 31b, and the resultant current is applied to the laminated piezo-electric devices 83a, 83b, whereby non-resonant vibration in directions indicated by an arrow B in FIG. 11 is generated in the second vibrator assembly 85.

Figure 12:
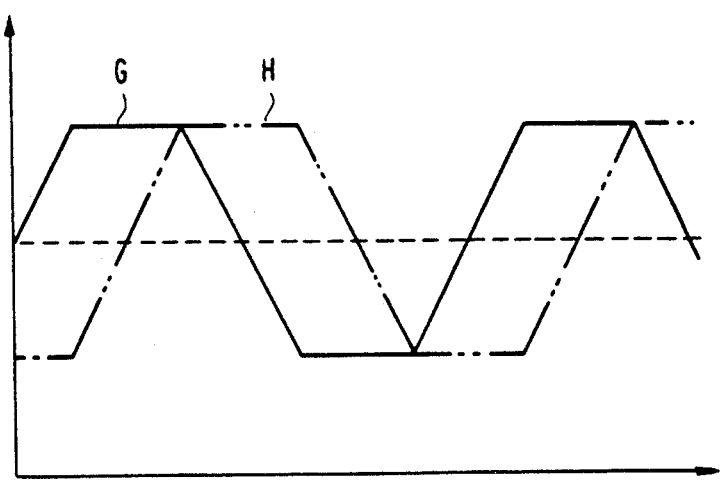
FIG. 12 is a voltage waveform diagram showing voltage waveforms applied to a first and a second vibrator assemblies.
Figure 13:
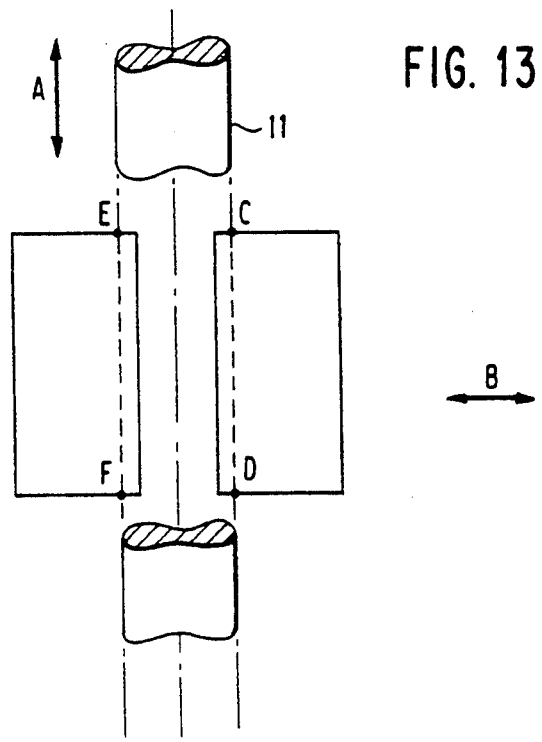
FIG. 13 illustrates the vibration locuses of wire electrode driving members driven by the waveform of FIG. 12.

The vibration displacement of each vibrator is sinusoidal and the vibration loci of the wire electrode driving members 32a, 32b are elliptical in the embodiments described above employing the resonance vibrators in the first and second vibrator assemblies. However, the vibration displacement waveform of the non-resonance-driven vibrators employed in the first vibrator assembly 47 of the fourth embodiment and a second vibrator assembly (not shown) have a vibration direction perpendicular to that of the first vibrator assembly 47. As in the third embodiment, the displacement waveform is substantially identical to the applied voltage waveform. This allows the vibration loci of the wire electrode driving members to be optionally shaped according to the waveform of the applied voltage. For example, when voltage having trapezoidal-wave, alternating-current components which are approximately 45° out of phase with each other as indicated by G and H in FIG. 12 are applied to the first vibrator assembly 47 and second vibrator assembly 85, respectively, the vibration loci of the wire electrode driving members 32a and 32b become rectangular as shown in FIG. 13. It should be noted that dotted lines CD and EF in FIG. 13 indicate vibration locuses where the wire electrode 11 is clamped between the wire electrode driving members 31a and 32b. In a vibration region ranging from C to D (and from E to F), the wire electrode 11 is gripped by the wire electrode driving members 32a, 32b and driven in a predetermined direction. The gripping and releasing effect in the B direction on the wire electrode 1 is similar to that of the first embodiment.

FIG. 14 illustrates a fifth embodiment of the present invention, wherein resonance blocks 20a and 20b are coupled to piezo-electric devices 21a and 21b which serve as a vibration source. Electrode plates 22a and 22b, and a supporting member 23 are provided as in the previous embodiments. Vibrator assembly 24 comprises the resonance blocks, piezo-electric devices, electrode plates and supporting member. In this embodiment a presser member 50, a presser driver 51, and a drive controller 52 for the presser driver 51 are also provided. A presser assembly 53 comprises the presser member, presser driver and drive controller. A horn 54 serves as a vibration expander. The other parts in FIG. 11 are similar to those shown in FIG. 1 and therefore will not be described further.

Figure 16:
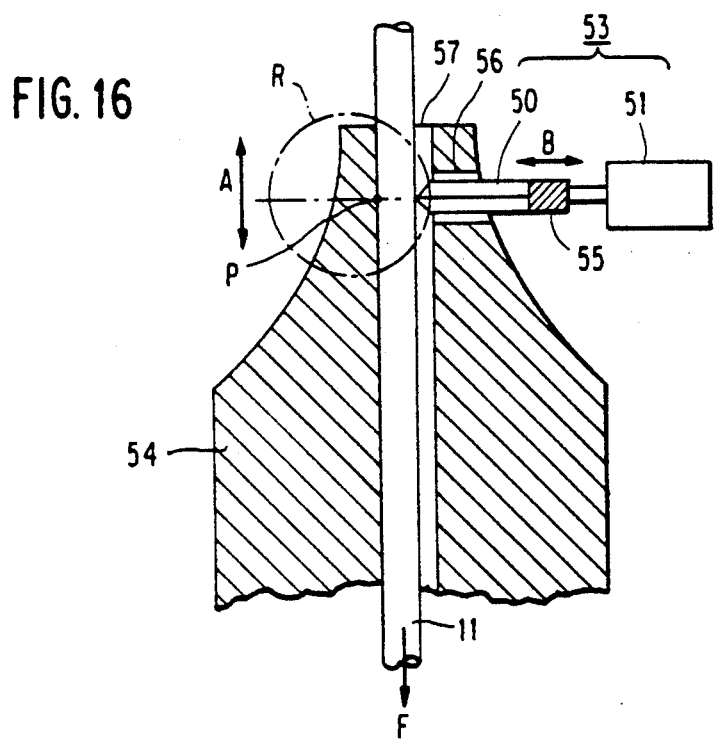
FIG. 16 is an expanded sectional view of the vibrator assembly of the fifth embodiment of the present invention.

FIG. 15 and FIG. 16 are exploded views illustrating the structure of the vibrator assembly 24 and presser assembly 53 of FIG. 11 in greater detail. FIG. 16 is an expanded diagram of a portion of FIG. 15, wherein the presser member 50 is connected with the presser driver 51 via an elastic body 55 and the end of the presser member 50 is slidable so as to move in a direction indicated by an arrow B through a hole 56 formed perpendicular to the vibration direction of the horn 54 designated by an arrow A.

The length of the horn 54 against which the wire electrode 11 is pressed in the vibrator assembly 24 is designed to be ½ of the natural resonance wavelength of lengthwise vibration produced in a longitudinal direction (designated by arrow A in FIG. 14) at a predetermined frequency. Hence, the application of an alternating-current voltage of the predetermined frequency to the piezo-electric devices 21a, 21b via the electrode plates 22a, 22b produces longitudinal vibration having a point of maximum deflection located proximate the hole 56 through which the presser member 50 moves in the horn 54 and a node located in the central part adjacent to the supporting member 23. Also, the diametrical centers of the resonance blocks 20a, 20b and bolt 29 are provided with a longitudinal through hole 57 having a sufficiently large diameter as compared to the diameter of the wire electrode 11. This will assure that the wire electrode 11 can pass through the vibrator assembly 24 without being affected by the vibratory operation of the vibrator assembly 24.

The operation of the fifth embodiment will now be described.

Figure 17:
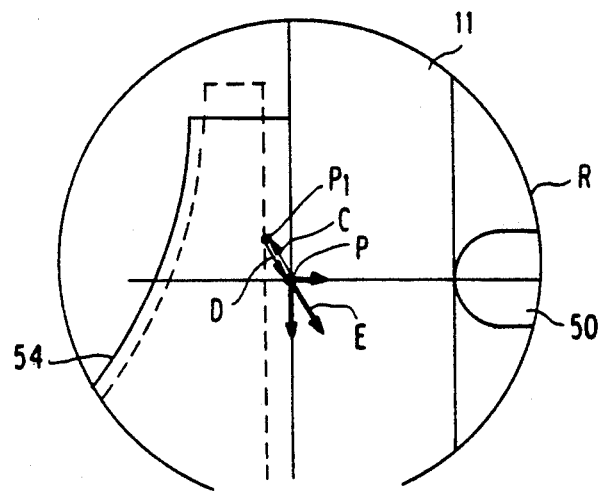
FIG. 17 illustrates the operation of the vibrator assembly of the fifth embodiment of the present invention.

When resonated, the horn 54 expands in a longitudinal direction and simultaneously contracts in a diametrical direction as indicated by a dotted line in FIG. 17. In other words, a point P in the horn 54 against which the wire electrode 11 is pressed by the presser member 50 moves on a substantially linear, reciprocating vibration locus wherein it moves to a point P1 and then returns to the original location. When the horn 54 vibrates in the direction of an arrow C, a clearance is made between the end of the presser member 50 and the point P of the horn 54, reducing the pressing force, whereby the wire electrode 11 is not fed. However, when the horn 54 vibrates in the direction of arrow D the wire electrode 11 is pressed against the horn 54 via an elastic body 55 located between presser member 50 and presser driver 51. Therefore, the force applied to the wire electrode 11 at the point P can be represented by a vector shown in FIG. 17, where a frictional force is applied to the wire electrode 11 by means of a composite force in a direction E. As a result, the wire electrode 11 can be fed and driven in the direction of an arrow F.

Figure 18:
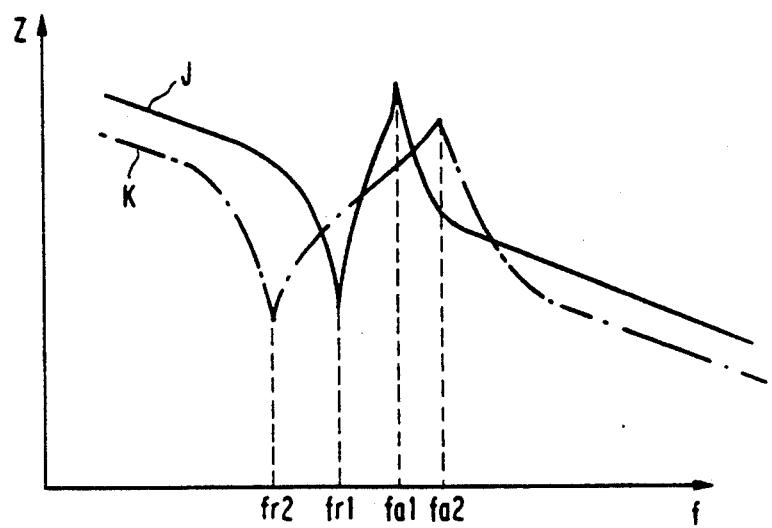
FIG. 18 is a waveform diagram illustrating the resonance characteristics of first and second vibrator assemblies of a sixth embodiment.

FIG. 18 is a graph showing the particular resonance characteristics of the first and second vibrator assemblies similar to those of the first embodiment. The sixth embodiment utilizes a wire electrode feeder of a similar arrangement to the first embodiment. However, the characteristics of the vibrator assemblies of the sixth embodiment are as follows. Referring to FIG. 18, a vertical axis indicates impedance and a horizontal axis frequency. The curve J is the resonance characteristic of the first vibrator assembly, and the curve K that of the second vibrator assembly. The resonant frequency and anti-resonant frequency of the first vibrator assembly are indicated at fr1 and fa1, respectively, and those of the second vibrator assembly are indicated at fr2 and fa2, respectively.

In the sixth embodiment, a frequency difference fa1−fr1 between the resonant frequency and anti-resonant frequency of the first vibrator assembly is designed to be smaller than a frequency difference fa2−fr2 between the same frequencies of the second vibrator assembly, and the resonant frequency fr1 and anti-resonant frequency fa1 of the first vibrator assembly are designed to be located in an area between the resonant frequency fr2 and anti-resonant frequency fa2 of the second vibrator assembly.

Also, the drive control of the present embodiment can be carried out in an identical manner to the first embodiment. In the drive control section 28 illustrated in FIG. 6, the oscillation frequency of the oscillator circuit 37 is set to a frequency adjacent to the resonant frequency fr1 of the first vibrator assembly which is smaller in frequency difference between the resonant frequency and anti-resonant frequency. The wire electrode 11 of the sixth embodiment is driven in a manner similar to that of the first embodiment.

A wire electrode feeder for a wirecut electrical discharge machine according to a seventh embodiment can be arranged in a manner similar to the feeder of the first embodiment shown in FIG. 1. In the embodiment shown in FIG. 1, the first vibrator assembly 24 having a vibratory component in a wire feeding axis direction is a columnar, bolted Langevin vibrator, comprising key components such as the resonance blocks 20a, 20b, piezo-electric devices 21a, 21b, supporting and fixing member 23 and bolt 29. In the seventh embodiment, a member constituting the resonance block 20a of the first vibrator assembly 24 not connected to the second vibrator assembly 27 is smaller in sonic velocity than a member constituting the resonance block 20b thereof connected to the second vibrator assembly 27.

For instance, in the aforementioned embodiment, assume that the resonance block 20a of the first vibrator assembly 24 is made of a brass material (sonic velocity: approximately 4700 m/s) and the resonance block 20b is made of a duralumin material (sonic velocity: approximately 6320 m/s).

Generally, the resonant frequency of the vertical vibration of a bar is represented by the following expression supposing that the resonant frequency is f, the length of the bar is l, the sonic velocity of the bar material is v, and a coefficient determined by boundary conditions and a vibration mode is k:

$$f = k \cdot \frac{v}{l} \quad (1)$$

and is directly proportional to the sonic velocity v of the bar material and inversely proportional to the bar length. By approximating the first vibrator assembly 24 to be a simple bar and supposing that the resonant frequency of the vibrator assembly 24 is fr0, the sonic velocity of the brass material is va, and that of the duralumin material is vb, the lengths la and lb of the resonance blocks 20a and 20b made of the brass and duralumin materials are as follows, respectively:

$$la = K \cdot \frac{Va}{fr0} \quad (2)$$

$$lb = K \cdot \frac{Vb}{fr0} \quad (3)$$

The length lab of the first vibrator assembly 24 comprising the brass resonance block 20a and duralumin resonance block 20b may be approximated as follows:

$$lab \approx \tfrac{1}{2}(la + lb) \quad (4)$$

Therefore, when the resonance block 20a is made of the brass material and the resonance block 20b is made of the duralumin material, the length of the first vibrator assembly 24 can be reduced to about 0.87 times as compared to when the resonance blocks 20a, 20b are both made of the duralumin material as indicated by the following expression:

$$\frac{lab}{la} = \frac{\tfrac{1}{2}(Va + Vb)}{Va} = 0.87 \quad (5)$$

While the contraction factor is a value calculated on the assumption that the first vibrator assembly 24 is a simple bar, the second vibrator assembly 27 is connected to the end of the resonance block 20b in the actual arrangement. Hence, the length of the resonance block 20b is shorter due to the effect of the additional mass of the second vibrator assembly 27, and the ratio of the length of resonance block 20a accounting for the length of the first vibrator assembly 24 is higher than that based upon the assumption. This makes the length of the first vibrator assembly 24 even shorter.

It should be noted that whereas the length of the first vibrator assembly 24 is the smallest when the resonance blocks 20a and 20b are both made of the brass material in the embodiment, the length of the resonance block 20b is shorter, in this case, than that of the one made of the duralumin material, thus making the vertical vibration amplitude in the wire electrode feeding axis direction smaller and the wire electrode feeding speed lower.

The wire electrode 11 in this embodiment is also driven and operated similar to the first embodiment.

Figure 19:
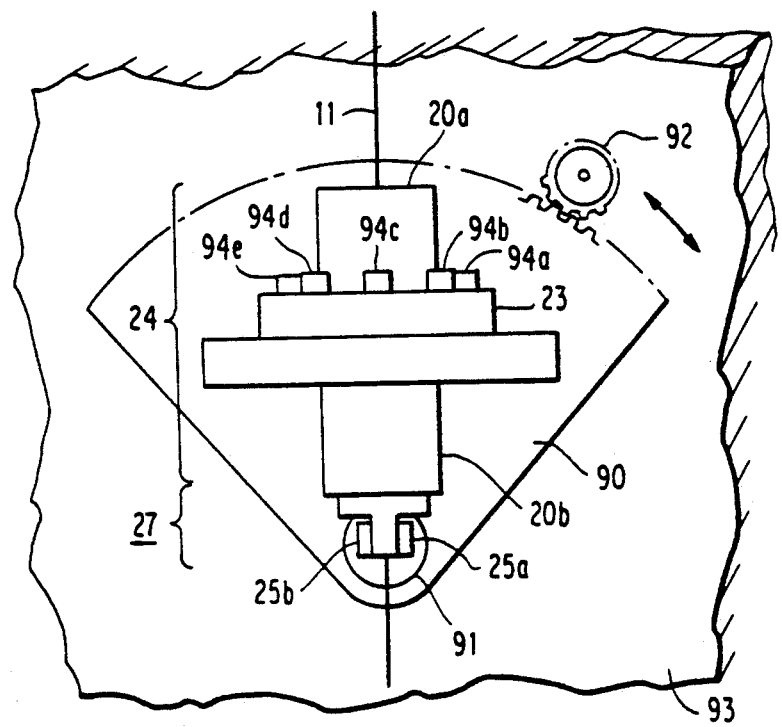
FIG. 19 is a front view showing the arrangement of a wire electrode feeder for a wirecut electrical discharge machine in accordance with an eighth embodiment of the present invention.
Figure 20:
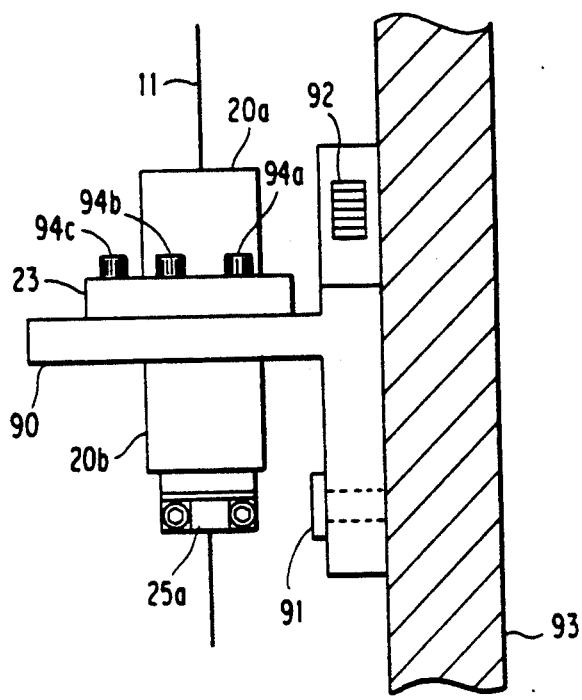
FIG. 20 is a side view showing the arrangement of the wire electrode feeder for a wirecut electrical discharge machine in accordance with the eighth embodiment of the present invention.

FIGS. 19 and 20 are a front view and a side arrangement view, respectively, of a wire feeding mechanism in a wire electrode feeder for a wirecut electrical discharge machine according to an eighth embodiment of the invention. A mounting member 90 supports a first vibrator assembly 24, and is rotatable about a support pin 91. A rotary gear 92 engages with the mounting member 90 for rotating the mounting and fixing member 90. Bolts 94a-94e secure fixing member 23 of the first vibrator assembly 24 to the mounting and fixing member 90.

Two vibrator assemblies 24 and 27 for feeding a wire electrode 11 in the eighth embodiment are arranged in a similar manner to those in the first embodiment shown in FIG. 1, with the exception that the set gap of wire electrode driving members 32a and 32b provided in opposed relation to each other across the wire electrode is larger than a sum of the diameter of the wire electrode 11 and the vibration amplitudes of the vibrator pair 25a and 25b.

Figure 21:
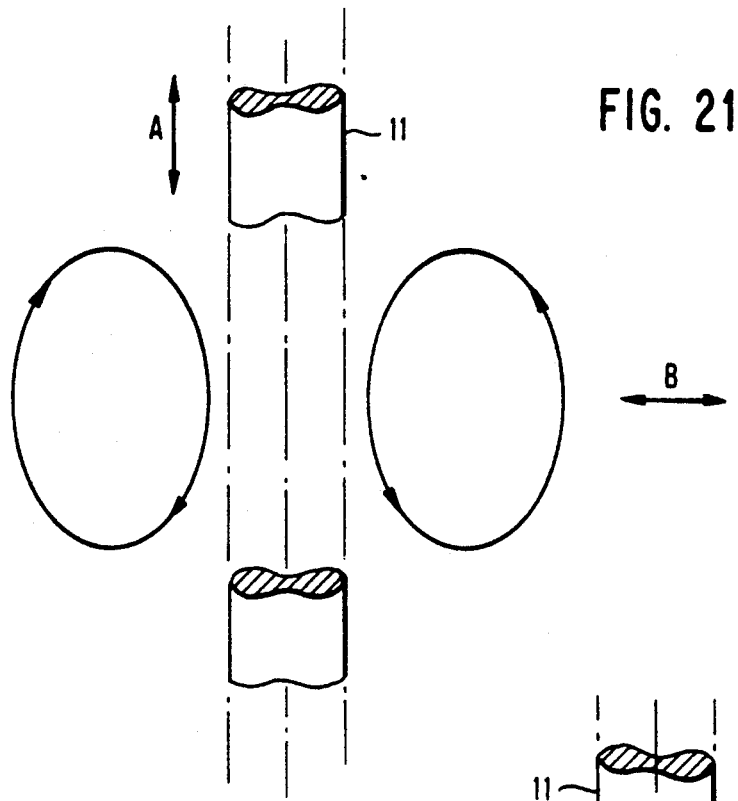
FIG. 21 illustrates the vibration loci of wire electrode driving members of the eighth embodiment of the present invention.
Figure 22:
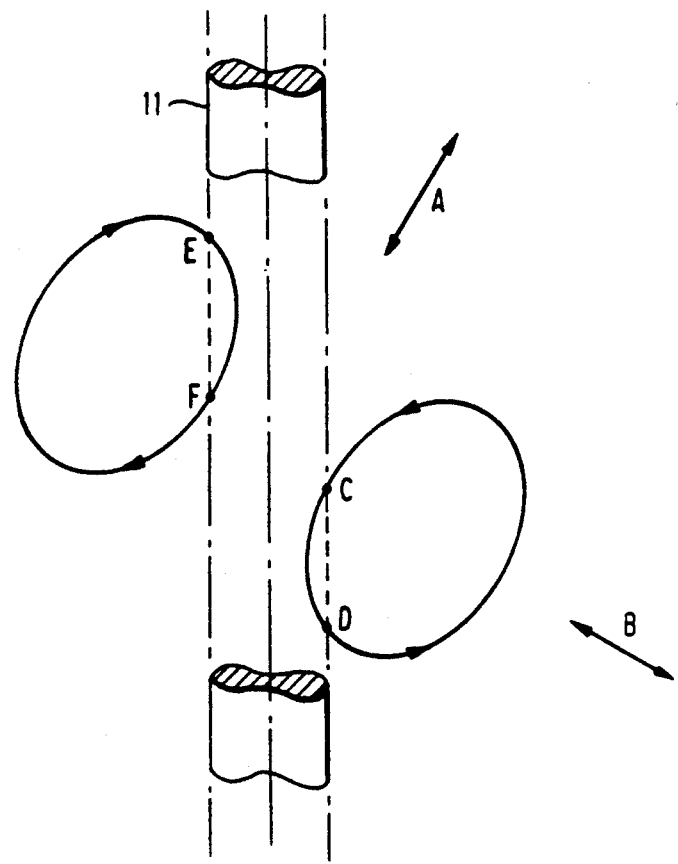
FIG. 22 illustrates the vibration loci of the wire electrode driving members of the eighth embodiment of the present invention.
Figure 23:
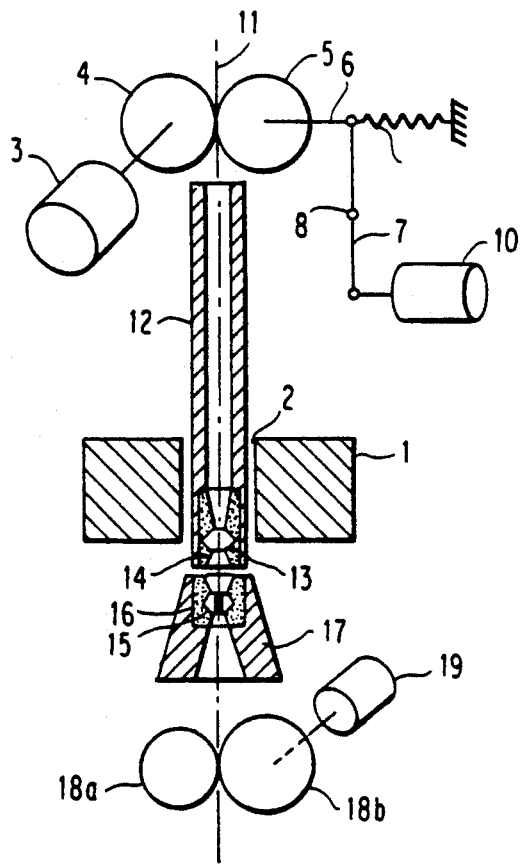
FIG. 23 shows the arrangement of a wire electrode feeder known in the art.
Figure 24:
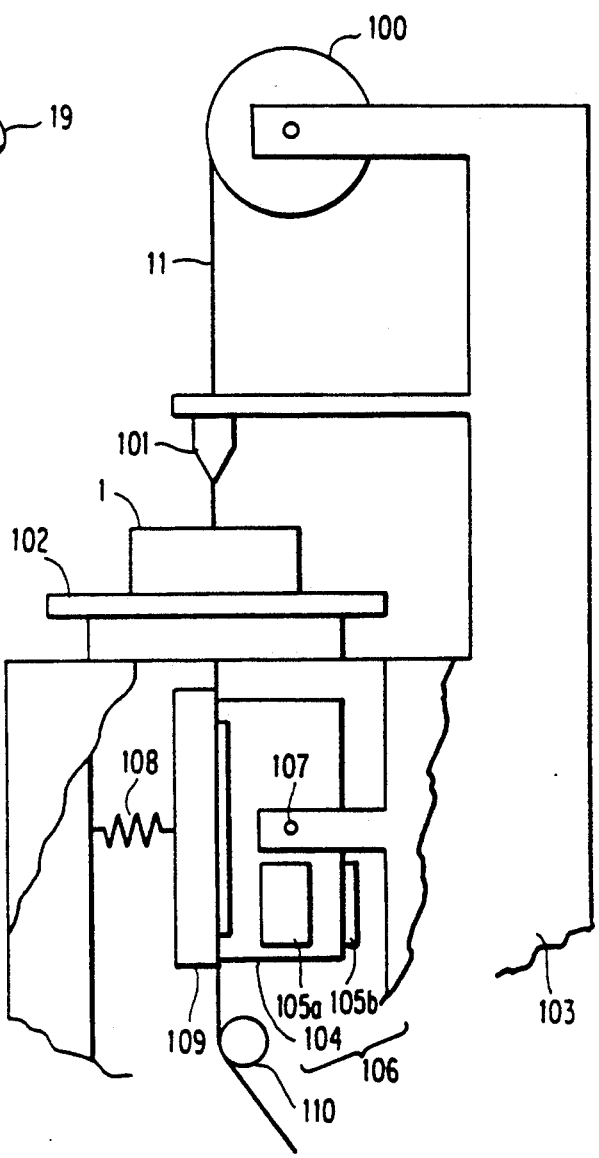
FIG. 24 shows the arrangement of an alternative wire electrode feeder of the prior art.

Hence, by causing the rotary gear 92 to be operated by a drive motor, not shown, to make the wire electrode driving members 32a and 32b parallel with a wire feeding axis direction (positional relationships between the vibration loci of the wire electrode driving members 32a, 32b and the wire electrode 11 are shown in FIG. 21) the wire electrode 11 does not make contact with, and is therefore not driven by, the wire electrode driving members 32a, 32b. However, by causing the rotary gear 92 to be operated by the drive motor, not shown, to slant the wire electrode driving members 32a, 32b at an adequate angle with respect to the wire feeding axis direction, the vibration locuses of the wire electrode driving members 32a, 32b overlap with the feeding path of the wire electrode 11 as shown in FIG. 22, and the wire electrode 11 is gripped by the wire electrode driving members 32a, 32b and driven in a predetermined direction within vibration regions indicated by dotted lines CD and EF in FIG. 22.

It will be apparent that the invention, as described above, achieves a wire electrode feeder which offers a highly reliable wire electrode feeding function. The feeding means of the wire electrode feeder according to the present invention comprises a structure for providing a wire electrode with a vibration component in a feeding direction by gripping and releasing the wire electrode alternately, thereby allowing the wire electrode to be fed without being curled. Also, the feeding apparatus transmits mechanical vibration energy to the wire electrode while the wire is being fed, facilitating the passage of the wire electrode through the electrode guide. Also the invention produces the feeding effect by virtue of a single vibrator, not only simplifying the vibrator section but also allowing wire electrodes of various diameters to be fed.

In general, high-accuracy design and machining are required to match the resonant frequencies of two vibrator assemblies. However, the sixth embodiment allows both vibrator assemblies to be substantially resonance-driven without requiring high-accuracy machining to completely match resonant frequencies of the two vibrator assemblies, because the resonance characteristics of the two vibrator assemblies are set so that the resonant frequency and anti-resonant frequency of one vibrator assembly are located in an area between both frequencies of the other vibrator assembly and because the other vibrator assembly is driven in synchronization with the resonant frequency of the one vibrator smaller in said frequency difference.

It will further be apparent that the seventh embodiment allows the length of a first vibrator assembly to be shortened without deteriorating the feeding characteristics of the wire electrode, thereby making a wire electrode feeder more compact. The sonic velocity of a member constituting a resonance block of the first vibrator assembly not connected to a second vibrator assembly is smaller than that of a member constituting a resonance block thereof connected to the second vibrator assembly.

It will further be apparent that the eighth embodiment not only allows a gap between wire electrode driving members to be set to a large value so that the machining accuracy of a second vibrator assembly may be eased, but also allows a wire electrode to be pressed against feeding vibrators when the wire electrode is driven, without employing a special pressing mechanism, such as a cylinder. In addition, if the wire electrode driving members are worn, sufficient driving force is provided by increasing the inclination of the feeding vibrators, thereby prolonging the lives of the feeding vibrators.

It will be apparent to those skilled in the art that various other modifications can be made to the embodiments without departing from the scope of the invention as defined by the appended claims.

What is claimed is:

1. A wire electrode feeder for a wirecut electrical discharge machine for feeding a wire electrode to an electrode guide and causing an electrical discharge to be produced by applying a predetermined voltage between a workpiece and said wire electrode, thereby machining said workpiece, said wire electrode feeder comprising:
    a plurality of vibrator assemblies, at least a first vibrator assembly and a second vibrator assembly of said vibrator assemblies having different vibrating directions;
    a supporting member coupled to said first and second vibrator assemblies so as to fixedly support said first and second vibrator assemblies;
    wire electrode driving members provided in at least one of said first and second vibrator assemblies; and
    a drive controller coupled to said vibrator assemblies so as to drive said vibrator assemblies so that said wire electrode driving members vibrate while alternately holding and releasing said wire electrode while traveling along a circulating locus having a vibratory component in a wire electrode feeding direction,
    wherein said first vibrator assembly has a first frequency difference between a resonant frequency and an anti-resonant frequency thereof and said second vibrator assembly has a second frequency difference between a resonant frequency and an anti-resonant frequency thereof, said first frequency difference being less than said second frequency difference, the resonant frequency and anti-resonant frequency of said first vibrator assembly being located in a range between the resonant frequency and the anti-resonant frequency of said second vibrator assembly.

2. A wire electrode feeder for a wirecut electrical discharge machine as defined in claim 1, wherein
    said drive controller drives said second vibrator assembly in synchronization with the resonant frequency of said first vibrator assembly.

3. A wire electrode feeder as claimed in claim 1, wherein said second vibrator assembly includes two driving members which are disposed in opposition to each other so as to define a gap therebetween through which a wire electrode can pass, said driving members vibrating between first and second positions with respect to said second vibrator assembly, said gap being larger than a diameter of said wire electrode when said driving members are in said first position, said gap being smaller than a diameter of said wire electrode when said driving members are in said second position.

4. A wire electrode feeder as claimed in claim 1, wherein said first and second vibrator assemblies include piezo-electric devices.

5. A wire electrode feeder as claimed in claim 1, said first vibrator assembly comprising:
    a first bar member;
    a second bar member connected to said second vibrator assembly; and
    disposed between said first and
    a vibration source disposed between said first and second bar members.

6. A wire electrode feeder as claimed in claim 5, wherein a vibrational velocity of said first bar member is smaller than the vibrational velocity of said second bar member.

7. A wire electrode feeder as claimed in claim 6, wherein said first block member is made of brass and said second block member is made of duralumin.

8. A wire electrode feeder for a wirecut electrical discharge machine for feeding a wire electrode to an electrode guide and causing an electrical discharge to be produced by applying a predetermined voltage between a workpiece and said wire electrode, thereby machining said workpiece, said wire electrode feeder comprising:
    a vibrator assembly; and
    a movable presser assembly placed in opposition to said vibrator assembly so as to press said wire electrode against said vibrator assembly from a direction different from a vibrating direction of said vibrator assembly, only when a component of the vibrating direction of said vibrator assembly is in an electrode feeding direction,
    the vibration of said vibrator assembly and the pressure of said movable pressure assembly producing a vibrator component with respect to said wire electrode in its feeding direction,
    wherein said vibrator assembly includes a horn through which said wire electrode passes and which has a length corresponding to a portion of the wavelength of vibration produced in the electrode feeding direction at a predetermined frequency so as to produce vibration in the electrode feeding direction having a point of maximum deflection proximate a predetermined position of said movable presser assembly and said vibrator assembly.

9. A wire electrode feeder for a wirecut electrical discharge machine for feeding a wire electrode to an electrode guide and causing an electrical discharge to be produced by applying a predetermined voltage between a workpiece and said wire electrode, thereby machining said workpiece, said wire electrode feeder comprising:
    a plurality of vibrator assemblies, at least a first vibrator assembly and a second vibrator assembly of said vibrator assemblies having different vibrating directions;
    a supporting member coupled to said first and second vibrator assemblies so as to fixedly support said first and second vibrator assemblies;
    wire electrode driving members provided in at least one of said first and second vibrator assemblies; and
    a drive controller coupled to said vibrator assemblies so as to drive said vibrator assemblies so that said wire electrode driving members vibrate while alternately holding and releasing said wire electrode while traveling along a circulating locus having a vibratory component in a wire electrode feeding direction, wherein said first vibrator assembly comprises bar-shaped resonance blocks on first and second sides of a supporting and fixing member and having a vibratory component in a wire feeding axis direction and said second vibrator assembly is connected to a first of said resonance blocks of said first vibrator assembly and has a vibratory component in a direction substantially perpendicular to the wire feeding axis direction, a second of said resonance blocks of said first vibrator assembly, not connected to the second vibrator assembly, having a vibration velocity smaller than that of said first of said resonance blocks thereof.

10. A wire electrode feeder for a wirecut electrical discharge machine for feeding a wire electrode to an electrode guide and causing an electrical discharge to be produced by applying a predetermined voltage between a workpiece and said wire electrode, thereby machining said workpiece, said wire electrode feeder comprising:
- a plurality of vibrator assemblies, at least a first vibrator assembly and a second vibrator assembly of said vibrator assemblies having different vibrating directions;
- a supporting member coupled to said first and second vibrator assemblies so as to fixedly support said first and second vibrator assemblies;
- wire electrode driving members provided in at least one of said first and second vibrator assemblies; and
- a drive controller coupled to said vibrator assemblies so as to drive said vibrator assemblies so that said wire electrode driving members vibrate while alternately holding and releasing said wire electrode while traveling along a circulating locus having a vibratory component in a wire electrode feeding direction,
- wherein said first vibrator assembly includes means for generating vibration in a wire electrode feeding axis direction and said second vibrator assembly is provided on part of said first vibrator assembly and comprises a pair of vibrators for generating vibration in a direction substantially perpendicular to the wire electrode feeding axis direction, and
- wherein said wire electrode driving members are disposed opposed to each other across the wire electrode, a gap defined between said wire electrode driving members being larger than a sum of the diameter of said wire electrode and the vibration amplitudes of said pair of vibrators,
- the second vibrator assembly being pivotably mounted on said first vibrator assembly so as to be rotatable relative to the wire electrode feeding axis.

11. A wire electrode feeder for a wirecut electrical discharge machine, comprising:
- a first vibrator assembly having a vibrating direction which is parallel to a wire feeding direction;
- a second vibrator assembly connected to a portion of said first vibrator assembly, said second vibrator assembly comprising at least one driving member movably coupled thereto so as to be movable in a direction perpendicular to said wire feeding direction with respect to said second vibrator assembly; and
- a driver for driving said first and second vibrator assemblies in concert at respective frequencies;
- wherein said first vibrator assembly has a first frequency difference between a resonant frequency and an anti-resonant frequency thereof and said second vibrator assembly has a second frequency difference between a resonant frequency and an anti-resonant frequency thereof, said first frequency difference being less than said second frequency difference, the resonant frequency and anti-resonant frequency of said first vibrator assembly being located in a range between the resonant frequency and the anti-resonant frequency of said second vibrator assembly.

12. A wire electrode feeder as claimed in claim 11, wherein said driver includes a phase shifter, a first output of said driver being coupled to said first vibrator assembly so as to drive said first vibrator assembly at a first frequency, a second output of said driver being coupled to said second vibrator assembly so as to drive said driving member at said first frequency and out of phase with said first vibrator assembly.

13. A wire electrode feeder as claimed in claim 12, wherein said first and second outputs of said driver are sinusoidal waveforms.

14. A wire electrode feeder as claimed in claim 12, wherein said first and second outputs of said driver are trapezoidal waveforms.

15. A wire electrode feeder for a wirecut electrical discharge machine adapted for use with a wire electrode, comprising:
- means for vibrating a body in a first direction which is parallel to a wire feeding direction;
- means for selectively grasping said wire electrode, said means for grasping being mounted on said body; and
- means for activating said means for grasping when said body has a component of vibration in a wire feeding direction, wherein said body includes a horn through which said wire electrode passes and which has a length corresponding to a portion of the natural wavelength of vibration produced in the first direction at a predetermined frequency so as to produce vibration in the first direction having a point of maximum deflection proximate a connecting point of said means for grasping and said body.

* * * * *